US012732380B2

(12) United States Patent
SimhaRaghu et al.

(10) Patent No.: US 12,732,380 B2
(45) Date of Patent: Sep. 8, 2026

(54) ISSUANCE AND VERIFICATION OF MULTI-CLAIM VERIFIABLE CREDENTIALS AND VERIFIABLE PRESENTATIONS

(71) Applicant: American Express Travel Related Services Company, Inc., New York, NY (US)

(72) Inventors: Mukund Shankar SimhaRaghu, Glendale, AZ (US); Andras L. Ferenczi, Scottsdale, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 153 days.

(21) Appl. No.: 18/456,012

(22) Filed: Aug. 25, 2023

(65) Prior Publication Data

US 2025/0070982 A1 Feb. 27, 2025

(51) Int. Cl.
*H04L 29/06* (2006.01)
*H04L 9/30* (2006.01)
*H04L 9/32* (2006.01)

(52) U.S. Cl.
CPC .......... *H04L 9/3242* (2013.01); *H04L 9/3073* (2013.01)

(58) Field of Classification Search
CPC ... H04L 9/3242; H04L 9/3073; H04L 9/3239; H04L 9/50
See application file for complete search history.

(56) References Cited

U.S. PATENT DOCUMENTS

2016/0350278 A1* 12/2016 Aharoni .................. G06F 16/27
2020/0013124 A1* 1/2020 Obee ...................... G06N 5/022
2021/0271744 A1* 9/2021 Murdoch ................ G06F 21/64
2022/0029825 A1* 1/2022 Uhr ........................ H04L 9/3239
2022/0164546 A1* 5/2022 Jiang ....................... G06F 40/40
2023/0262234 A1* 8/2023 Amini .................... H04N 19/42 709/219
2024/0106834 A1* 3/2024 Yamaoka ........... G06Q 30/0609
2024/0388579 A1* 11/2024 Buchner ............... H04L 63/083

* cited by examiner

*Primary Examiner* — Shawnchoy Rahman
(74) *Attorney, Agent, or Firm* — Thomas Horstemeyer, LLP

(57) ABSTRACT

Disclosed are various approaches for issuing and verifying multi-claim verifiable credentials and verifiable presentations. In various embodiments, an issuer can send a request for information to a holder and obtain a response from the holder. The issuer can extract claims from the message, validate at least one of the claims, and generate a verifiable credential (VC) for the holder based at least in part on the claims, which can be sent to the holder. The holder can then generate a verifiable presentation (VP) based at least in part on the VC and send the VP to a verifier. The verifier can then verify the VP and interpret the claims within the VC.

20 Claims, 7 Drawing Sheets

ISSUANCE AND VERIFICATION OF MULTI-CLAIM VERIFIABLE CREDENTIALS AND VERIFIABLE PRESENTATIONS

BACKGROUND

Decentralized Identifiers (DIDs) are globally unique identifiers that enable individuals, organizations, or devices (holders) to have verifiable and self-owned digital identities. Verifiable credentials (VCs) are data structures generated by issuers that represent claims about some attribute, qualification, or achievement of a holder. A holder can generate a verifiable presentation (VP) from VCs that can be presented to a verifier for easy verification of the authenticity and origin of the claim. Large Language Models (LLMs) are a type of artificial intelligence technology designed to understand and generate human-like text.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for issuing and verifying multi-claim verifiable credentials (VCs) and verifiable presentations (VPs). In various implementations of Decentralized Identifier (DID), VC, and VP standards, a verifiable credential is used to demonstrate the veracity of a single claim, which is sometimes referred to as a verifiable claim. As a result, each entity identified by a DID may concurrently hold a plurality of VCs to demonstrate a plurality of claims. For example, if Jane Doe wanted to demonstrate that she has an undergraduate degree from a first university and a graduate degree from a second university, Jane could hold two VCs—a first VC that claims that Jane Doe graduated with an undergraduate degree from the first university and a second VC that claims that Jane Doe graduated with a graduate degree from the second university. As Jane Doe interacts with various entities, she might hold additional VCs to demonstrate each and every claim she wishes to assert. This disclosure provides embodiments various approaches for issuing and verifying multi-claim verifiable credentials (VCs) and verifiable presentations (VPs).

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
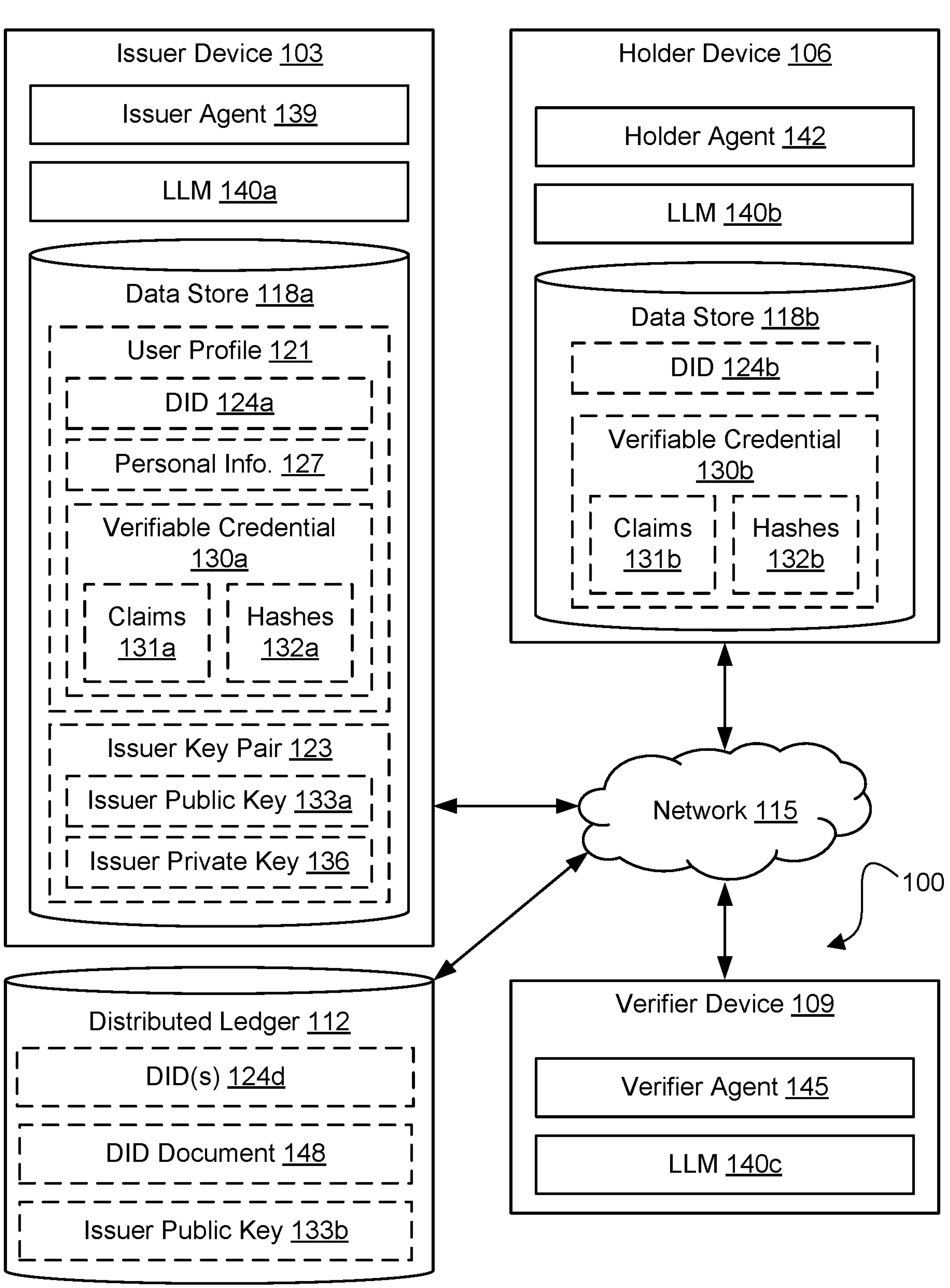
FIG. 1 is a drawing of a network environment according to various embodiments of the present disclosure.

With reference to FIG. 1, shown is a network environment 100 according to various embodiments. The network environment 100 can include an issuer device 103, a holder device 106, a verifier device 109, a distributed ledger 112, each of which can be in data communication with each other via a network 115.

The network 115 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The issuer device 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. In at least another example, the issuer device 103 can be embodied as a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a video game console, or other devices with like capability. The issuer device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the issuer device 103 or can be connected to the issuer device 103 through a wired or wireless connection.

Various data can be stored in a data store 118*a* that is accessible to the issuer device 103. The data store 118*a* can be representative of a plurality of data stores 118*b*, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the data store 118*a* is associated with the operation of the various applications or functional entities described below. This data can include a user profile 121, an issuer key pair 123, and potentially other data.

The user profile 121 can represent user data stored in association with other usages of the issuer device 103. For example, if the issuer device 103 is an e-commerce platform, then the user profile 121 can include user data in relation to usage of the e-commerce platform by the individual. Additionally, the user profile 121 can include one or more DIDs 124*a* (generically as 124), personal information 127 and verifiable credentials 130*a* (generically as 130)

The DID 124 can correspond to an identifier that enables verifiable, decentralized digital identity of a subject (e.g., person, organization, thing, etc.). In some examples, the DID 124 can be used to represent the identity of a user, a holder device 106, or other suitable subjects. In various examples, a DID 124 can include an address to a DID document 148 on a distributed ledger that includes information associated with the subject (e.g., a user, a holder device 106, etc.). DID documents 148 could be hosted on any computing environment, such as the issuer device 103, holder device 106, the verifier device 109, or any other computing environment. In such a situation, the DID document 148 could be shared peer-to-peer. In various examples, the DID 124 can be implemented using various standards, such as a version of the World Wide Web Consortium's (W3C's) Decentralized Identifier (DID) standard.

The personal information 127 can represent personal data associated with a user, name, address, contact information, transaction information (e.g., transaction confirmation, payment instruments, etc.), healthcare information, and other suitable user data. The personal information 127 can be used to identify a person or an entity associated with a DID 124.

A verifiable credential 130 (often abbreviated to VC) can represent a digital credential that has been issued by a third party, such as the issuer device 103. The verifiable credential 130 can be used to derive verifiable presentations, which are tamper-evident presentations encoded in such a way that the source of the data can be trusted after a process of verification. The verifiable presentations are synthesized in such a way that the verifiable credential 130 cannot be recreated from the verifiable presentation alone. Verifiable credentials 130 and verifiable presentations can be implemented using various standards, such as a version of the World Wide Web Consortium's (W3C's) Decentralized Identifier (DID) standard. A verifiable credential 130 can include claims 131*a* (generically as 131) and hashes 132*a* (generically as 132).

Claims 131 of a verifiable credential 130 are pieces of information that an entity asserts about itself or another subject. Examples of claims can include identity information (e.g., citizenship information, passport information, health information, etc.), qualifications (e.g., licenses, education information, certifications, etc.), memberships (e.g., clubs, professional associations, airport lounge access, etc.), ownership information (e.g., digital deeds, tickets, banking information, account information, etc.), or other information. Claims 131 can be presented in human-perceivable natural language, in a structured format (e.g., JavaScript Object Notation (JSON), Extensible Markup Language (XML), etc.), machine-readable code, or other formats.

Hashes 132 of a verifiable credential 130 are fixed-length alphanumeric strings of characters generated by applying mathematical algorithms, called hashing functions, to an input. A hashing function is a mathematical algorithm that takes one or more inputs and produces a fixed-size string of characters, typically a sequence of numbers and letters, that can uniquely represent the input. Examples of hashing functions include Message Digest Algorithm 5 (MD5), Secure Hash Algorithm 1 (SHA-1), Secure Hash Algorithm 256 (SHA-256), Secure Hash Algorithm 3 (SHA-3), bcrypt, and various other hashing functions. A hash 132 can be generated as a result of the hashing function by using one or more inputs, including claims 131, data salts, and key pairs (e.g., issuer key pair 123, etc.).

The issuer key pair 123 can represent a pair of asymmetric cryptographic keys comprising an issuer public key 133*a* (generically as 133) and issuer private key 136. The issuer public key can be used to cryptographically encrypt messages. The issuer private key 136 can be used to cryptographically decrypt messages that have been encrypted by the issuer public key 133. The issuer private key 136 can be used to cryptographically sign various items, such as verifiable credentials 130 or various messages. The issuer public key 133 can be used to cryptographically verify that something (e.g., a verifiable credential 130, a message, etc.) is cryptographically signed by the issuer private key 136.

Various applications or other functionality can be executed in the issuer device 103. The components executed on the issuer device 103 include an issuer agent 139, large language model (LLM) 140*a*, and other applications, services, processes, systems, engines, or functionality not discussed in detail herein.

The issuer agent 139 can be executed to perform various actions. For instance, the issuer agent 139 can send a request for information to a holder agent 142. Next, the issuer agent 139 can receive a response from the holder agent 142. Next, the issuer agent 139 can extract claims 131 from the response, validate one or more of the claims 131, and organize the claims 131. Next, the issuer agent 139 can generate a verifiable credential 130 from the claims 131 and send the verifiable credential 130 to the holder agent 142. Further discussion on the actions that the issuer agent 139 can be executed to perform will be discussed with regards to FIG. 3.

A large language model 140 can represent any language model that includes a neural network with many parameters (tens of thousands, millions, or sometimes even billions or more) that is trained on large quantities of unlabeled text using self-supervised learning or semi-supervised learning techniques. Some large language models 140 may be generative—that is they can generate new data based at least in part on patterns and structure learned from their input training data. Examples of large language models 140 include various versions of OPENAI's Generative Pre-trained Transformer (GPT) model (e.g., GPT-1, GPT-2, GPT-3, GPT-4, etc.) META's Large Language Model Meta AI (LLaMA), and GOOGLE's Pathways Language Model 2 (PaLM 2), among others. A large language model 140 can be configured to return a response to a prompt, which can be in a structured form (e.g., a request or query with a predefined schema and/or parameters) or in an unstructured form (e.g., free form or unstructured text). For example, a prompt could be a query such as "What is the creditworthiness of an individual with the included credit report?" or "What is the creditworthiness of an individual with the included financial information?"

The holder device 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. In at least one embodiment, the holder device 106 can be part of a plurality of computing devices that can be arranged in one or more server banks or computer banks or other arrangements. In some embodiments, the holder device 106 can be a client device. For example, the holder device 106 can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a video game console, or other devices with like capability. The holder device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the holder device 106 or can be connected to the holder device 106 through a wired or wireless connection.

Various data can be stored in a data store 118*b* that is accessible to the holder device 106. The data store 118*b* can be representative of a plurality of data stores 118*b*, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the data store 118*b* is associated with the operation of the various applications or functional entities described below. This data can include one or more DIDs 124*b*, verifiable credentials 130*b*, and potentially other data. DIDs 124*b* can be otherwise identical to the DIDs 124*a*, except stored in data store 118*b* rather than data store 118*a*. Verifiable credentials 130*b*, as well as the claims 131*b* and hashes 132*b* for which it comprises, can be otherwise identical to the verifiable credentials 130*a*, including the claims 131*a* and the hashes 132*a*, except stored in data store 118*b* rather than data store 118*a*.

Various applications or other functionality can be executed in the holder device 106. The components executed on the holder device 106 include holder agent 142, LLM 140*b*, and other applications, services, processes, systems, engines, or functionality not discussed in detail herein. The LLM 140*b* can be executed to perform various actions on behalf of the holder agent 142. LLM 140*b* can be otherwise similarly described to the LLM 140*a*, as previously discussed.

The holder agent 142 can be executed to perform various actions. For instance, the holder agent 142 can receive a request for information from an issuer agent 139, process the request for information to generate a response, and send the response to the issuer agent 139. Next, the holder agent 142 can receive a verifiable credential 130 from the issuer agent 139, generate a verifiable presentation from the verifiable credential 130, and send the verifiable presentation to a verifier agent 145. Further discussion on the actions that the holder agent 142 can be executed to perform will be discussed with regards to FIG. 4.

The verifier device 109 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. In at least one embodiment, the verifier device 109 can be included in a plurality of computing devices that can be arranged in one or more server banks or computer banks or other arrangements. In at least another embodiment, the verifier device 109 can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a video game console, or other devices with like capability. The verifier device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the verifier device 109 or can be connected to the verifier device 109 through a wired or wireless connection.

Various data can be stored in a data store 118*b* that is accessible to the verifier device 109. The data store 118*b* can be representative of a plurality of data stores 118*b*, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the data store 118*b* is associated with the operation of the various applications or functional entities described below. This data can include one or more DIDs 124*c*, verifiable credentials 130*c*, and potentially other data. DIDs 124*c* can be otherwise identical to the DIDs 124*a* and DIDs 124*b*, except stored in data store 118*c* rather than data store 118*a* or data store 118*b*. Verifiable credentials 130*c* can be otherwise identical to the verifiable credentials 130*a* or verifiable credentials 130*b*, except stored in data store 118*c* rather than data store 118*a* or data store 118*b*.

Various applications or other functionality can be executed in the verifier device 109. The components executed on the verifier device 109 include verifier agent 145, LLM 140*c*, and other applications, services, processes, systems, engines, or functionality not discussed in detail herein. The LLM 140*c* can be executed to perform various actions on behalf of the holder agent 142. LLM 140*c* can be otherwise similarly described to the LLM 140*a*, as previously discussed.

The verifier agent 145 can be executed to perform various actions. For example, the verifier agent 145 can receive a verifiable presentation from a holder agent 142. Then, the verifier agent 145 can verify the verifiable presentation. If the verifiable presentation is valid, then the verifier agent 145 can interpret the claims 131 in the verifiable presentation. Further discussion on the actions that the verifier agent 145 can be executed to perform will be discussed with regards to FIG. 5.

The distributed ledger 112 can represent one or more synchronized, eventually consistent, data stores spread across multiple nodes in different geographic or network locations. Each node in the distributed ledger 112 can contain a replicated copy of the distributed ledger 112, including all data stored in the distributed ledger 112. Records of transactions involving the distributed ledger 112 can be shared or replicated using a peer-to-peer network connecting the individual nodes that form the distributed ledger 112. Once a transaction or record is recorded in the distributed ledger 112, it can be replicated across the peer-to-peer network until the record is eventually recorded with all nodes.

The distributed ledger 112 can include DID(s) 124*d*, DID document(s) 148, one or more public keys, including the issuer public key 133*b*, and other suitable data. DIDs 124*d* can be otherwise identical to the DIDs 124*a*, DIDs 124*b*, and DIDs 124*c*, except stored on the distributed ledger 112 rather than data store 118*a*, data store 118*b*, or data store 118*c*, respectively. In various examples, a DID 124*d* can correspond to an address to a DID document 148 that includes information associated with a subject (e.g., user, transaction, device, etc.). For example, the DID document 148 can include a set of data describing the subject and can include various information (e.g., cryptographic keys) that can be used to authenticate the subject. In at least one example, the DID document 148 can include various public keys, such as the issuer public key 133*b*. In various examples, the DID 124*d* and the DID document 148 can be implemented using various standards, such as the World Wide Web Consortium's (W3C's) Decentralized Identifier (DID) standard. The issuer public key 133*b* can be otherwise identical to the issuer public key 133*a*, except stored in the distributed ledger 112 rather than the data store 118*a*.

Figure 2:
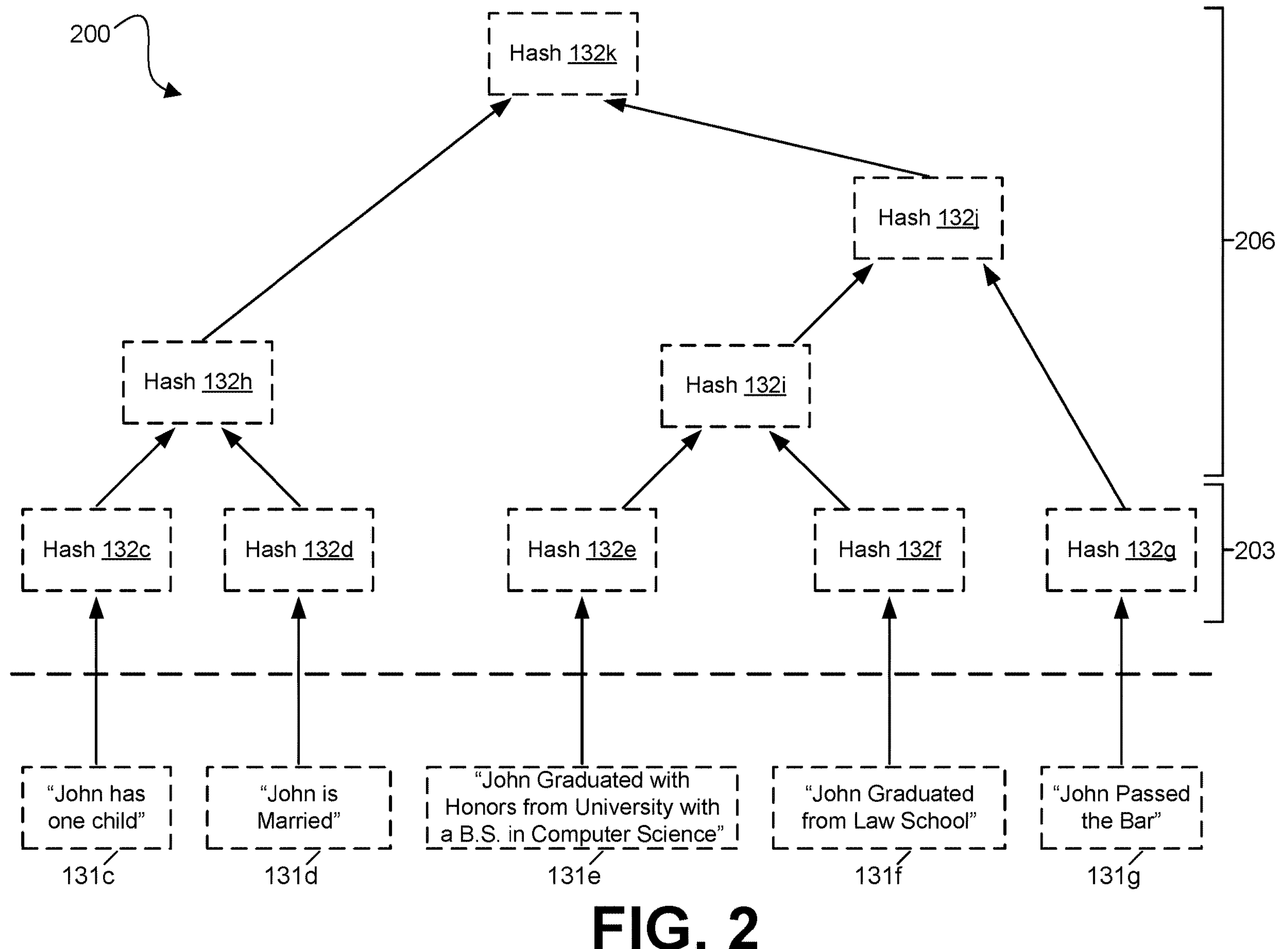
FIG. 2 is an exemplary drawing that depicts how claims can be hashed according to various embodiments of the present disclosure.

Referring next to FIG. 2, shown is an exemplary drawing that depicts how claims can be hashed according to various embodiments of the present disclosure. Specifically, shown is a tree structure 200 made of one or more hashes 132 that were generated from claims 131. Starting from the bottom left and moving to the bottom right, the exemplary drawing depicts examples of claims 131*c-g*. For example, a first claim 131*c* for a holder named John Doe can be that "John has one child." The second claim 131*d* can indicate that "John is married." A third claim 131*e* can indicate that "John graduated with honors from university with a B.S. in Computer Science." A fourth claim 131*f* can indicate that "John graduated from law school." A fifth claim can indicate that "John passed the bar."

As shown in the third claim 131*e*, some claims 131 can include more than one verifiable statement about the holder. For example, in the third claim 131*e*, the sentence "John graduated with honors from university with a B.S. in Computer Science" demonstrates more than one verifiable statement about John Doe. When a claim 131 has more than one verifiable statement about the holder those verifiable statements can be called subclaims because they are portions of a claim. For instance, the sentence of claim 131*e* can convey various subclaims, such as John graduated with honors, John graduated from a university, John graduated with a Bachelor of Science (B.S.), John majored in computer science, and various combinations of such subclaims. Additionally, subclaims can also be derived based at least in part on contextual language. For instance, it can be inferred from the sentence that John previously graduated based at least in part on the verb tense utilized in the sentence. As previously discussed, the claims 131 can be ingested by an LLM 140 for use by the agent (e.g., issuer agent 139, holder agent 142, and/or verifier agent 145, etc.). Each of the claims 131 can be presented in human-perceivable natural language (as depicted as claims 131*c-g* in FIG. 2), in a structured format (e.g., JavaScript Object Notation (JSON), Extensible Markup Language (XML), etc.), machine-readable code, or other formats.

Each of the claims 131*c-g* can be hashed using a specified hashing function to generate hashes 132*c-g*, respectively. Specifically, the first claim 131*c* can be processed through a hashing function to generate the first hash 132*c*. The second claim 131*d* can be processed through a hashing function to generate the second hash 132*d*. The third claim 131*e* can be processed through a hashing function to generate the third hash 132*e*. The fourth claim 131*f* can be processed through a hashing function to generate the fourth hash 132*f*. The fifth claim 131*g* can be processed through a hashing function to generate the fifth hash 132*g*. A hashing function is a mathematical algorithm that takes one or more inputs and produces a fixed-size string of characters, typically a sequence of numbers and letters, that can uniquely represent the input. Examples of hashing functions include Message Digest Algorithm 5 (MD5), Secure Hash Algorithm 1 (SHA-1), Secure Hash Algorithm 256 (SHA-256), Secure Hash Algorithm 3 (SHA-3), bcrypt, or various other hashing functions. The output of each of the hashes 132*c-g* is dependent at least on the input claims 131*c-g* and the specified hashing function used to generate the hashes 132*c-g*.

The claims 131*c-g* can be validated in various ways. In some embodiments, the claims 131*c-g* can be validated using one or more of the hashes 132. For example, the hashes 132 can be compared to checksum values to determine whether the claims 131*c-g* are valid. In some embodiments, the claims 131*c-g* can be validated using one or more timestamps to determine whether the data was last modified to validate the claims 131*c-g*. Various other ways of validating the claims 131*c-g* can also be used.

In some embodiments, the claims 131*c-g* can be validated using zero-knowledge proofs. Zero-knowledge proofs are protocols that enable a holder agent 142 to prove to a verifier agent 145 that a certain statement is true, without revealing any information about the statement itself. Zero-knowledge proofs allow for secure verification of information while maintaining privacy and confidentiality. Examples of zero-knowledge proofs include proofs of knowledge, proofs of membership, proofs of identity, proofs of shuffle, and proofs of solvency.

Each of the claims 131*c-g* can be organized into logical groups. In at least some embodiments, claims 131*c-g* can be organized based at least in part on their resulting hashes 132*c-g*. For example, the hashes 132*c-g* can be organized alphanumerically. In at least some embodiments, claims 131*c-g* can be organized by the relevant subject matter of each of the claims 131. For example, FIG. 2 depicts that the first claim 131*c* "John has one child" and the second claim 131*d* "John is married" clustered more closely together because the first claim 131*c* and the second claim 131*d* relate to his family life. By comparison, the first claim 131*c* and the second claim 131*d* may be further away from the third, fourth and fifth claims 131*e-g*, which are related more to work and education credentials. However, all the claims 131*c-g* are focused on the singular subject, John Doe. An agent (e.g., issuer agent 139, holder agent 142, and/or verifier agent 145, etc.) can send the claims 131 to an LLM 140 to identify, categorize, and/or organize the claims 131 into logical groups.

In at least some embodiments, the hashes 132 of the claims 131 can be represented as leaf nodes 203 in a tree structure 200. Leaf nodes 203 are nodes in a tree structure 200 that reside at the bottom-most level of the tree hierarchy without any child nodes. In FIG. 2, hashes 132*c-g* represent leaf nodes 203 in the tree structure 200. Leaf nodes 203 can be connected by branch nodes 206. Branch nodes 206 are nodes that have one or more child nodes (e.g., leaf nodes 203, branch nodes 206, etc.) connected lower in the tree structure hierarchy. In FIG. 2, hashes 132*h-k* represent branch nodes 206 in the tree structure 200. Specifically, a sixth hash 132*h* is a branch node 206 that connects the first hash 132*c* and the second hash 132*d*, both of which are leaf nodes 203. A seventh hash 132*i* is a branch node 206 that connects the third hash 132*e* and the fourth hash 132*f*, both of which are leaf nodes 203. An eighth hash 132*j* connects the seventh hash 132*i* (a branch node 206) and the fifth hash 132*g* (a leaf node 203). A ninth hash 132*k* connects the sixth hash 132*k* and the eighth hash 132*j*, both of which are branch nodes 206. The top-most branch node 206 in a tree structure 200 (e.g., the ninth hash 132*k* in FIG. 2, etc.) can be called a root node 209.

In at least some embodiments, the tree structure 200 can be organized as a Merkle tree. A Merkle tree, also known as a hash tree, can be used to efficiently verify the integrity and consistency of data. A Merkle tree is organized as a binary tree structure, such that each branch node 206 has exactly two child nodes (e.g., leaf nodes 203, child branch nodes 206, etc.). To verify the integrity of any specific data block in a Merkle tree, a verifier would only need to know the hashing algorithm and specific hashes 132 in the tree to calculate a generated hash 132 of the root node 209. The generated hash 132 can be compared to an authoritative root node 209 to determine whether the data is signed appropriately.

For example, to validate the first claim 131*c*, "John has one child," a verifier agent 145 could use the hashing function on the first claim 131*c* to create a value of the first hash 132*c*. Assuming that the second hash 132*d* is provided, a verifier agent 145 could use the hashing function to generate the sixth hash 132*h* based at least in part on the first hash 132*c* and the second hash 132*d*. Assuming that the eighth hash 132*j* is provided, a verifier agent 145 use the hashing function to generate the ninth hash 132*k* based at least in part on the sixth hash 132*h* and the eighth hash 132*j*. As a result, a tree structure 200 that has nine nodes (e.g., leaf nodes 203 and branch nodes 206) only shared the claim 131 (e.g., the first claim 131*c*) for which they wished to have validated, a hashing function, and two additional hashes 132 (e.g., the second hash 132*d* and the eighth hash 132*j*). The generated hash 132 can be compared to an authoritative root node 209 (e.g., the ninth hash 132*k* in FIG. 2, etc.) to determine whether the data is signed appropriately.

Figure 3:
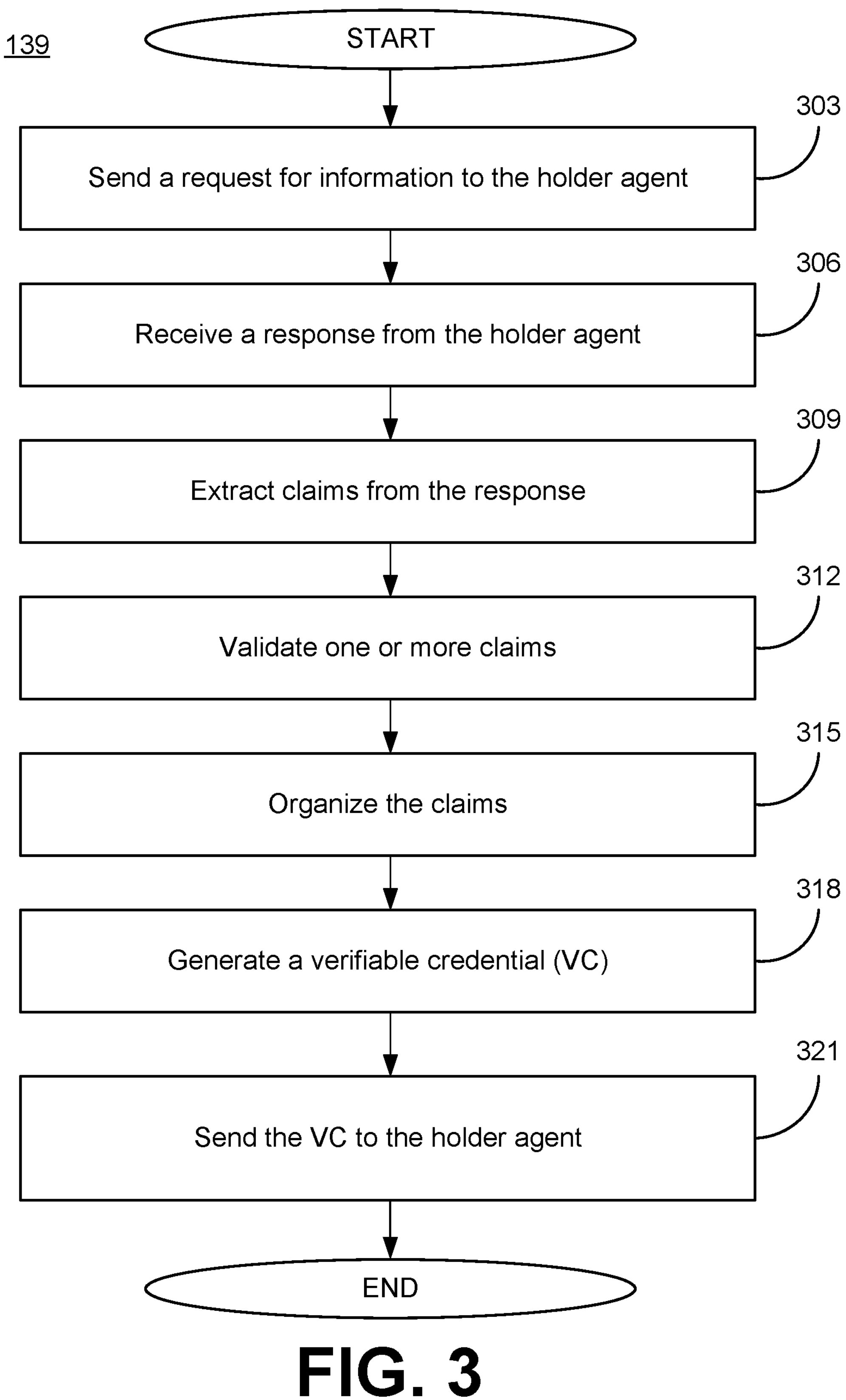
FIG. 3 is a flowchart illustrating one example of functionality implemented as portions of an application executed in an issuer device in the network environment of FIG. 1 according to various embodiments of the present disclosure.

Referring next to FIG. 3, shown is a flowchart that provides one example of the operation of a portion of the issuer agent 139. The flowchart of FIG. 3 provides merely an example of the many different types of functional arrangements that can be employed to implement the operation of the depicted portion of the issuer agent 139. As an alternative, the flowchart of FIG. 3 can be viewed as depicting an example of elements of a method implemented within the network environment 100.

Beginning with block 303, the issuer agent 139 can send a request for information to a holder agent 142. The request for information can be presented as human-perceivable natural language (e.g., emails, text messages, audio recordings, etc.), as a structured format (e.g., JavaScript Object Notation (JSON), Extensible Markup Language (XML), etc.), as machine-readable code, or other formats. In at least one embodiment, the request for information can be a request to provide specific pieces of information about a subject. For example, the request for information may include a request for a holder's name and account number. Such a request for information could be formatted as a message, like "Please provide your name and account number." In another example, the request for information could be presented as a structured format, like "{name: null, acct_no: null}". In at least another embodiment, the request for information can be a general request. For example, the request for information can be a message that states, "What credential are you seeking to have issued for you?" Various additional data can be sent to the holder agent 142 along with the request for information.

Next, at block 306, the issuer agent 139 can receive a response from the holder agent 142. The response from the holder agent 142 can be presented as human-perceivable natural language (e.g., emails, text messages, audio recordings, etc.), as a structured format (e.g., JavaScript Object Notation (JSON), Extensible Markup Language (XML), etc.), as machine-readable code, or other formats. The response can provide answers to the request for information sent at block 303. For example, a response to a request formatted as a message, like "Please provide your name and account number" could be "My name is John Doe and my account number is 1234567." In another example, the response to a request for information that is presented as a structured format, like "{name: null, acct_no: null}", could be "{name: 'John Doe', acct_no: 1234567}". In yet another example, for a request for information such as "What credential are you seeking to have issued for you?", a response could be, "Proof of funds," or various other responses based at least in part on the purpose of the embodiment.

Continuing to block 309, the issuer agent 139 can extract claims 131 from the response. In some embodiments, the issuer agent 139 can extract keywords from the response to generate the claims 131. In at least another embodiment, the issuer agent 139 can extract the claims 131 from the response by directing an LLM 140*a* to process the response. In such an embodiment, the issuer agent 139 can send the response along with a directive to the LLM 140*a*. In some embodiments, the directive sent to the LLM 140*a* can indicate that the issuer would like to extract one or more claims 131 from the response. In some embodiments, the directive sent to the LLM 140*a* can specify a format for how to extract the claims 131, such as human-perceivable natural language (e.g., text, audio recording, etc.), as a structured format (e.g., JavaScript Object Notation (JSON), Extensible Markup Language (XML), etc.), as machine-readable code, or as other formats.

Next, at block 312, the issuer agent 139 can validate one or more of the claims 131. With certain types of claims 131, the issuer agent 139 can validate the content of the claim 131. For example, the issuer agent 139 can verify the values of a claim 131 related to personal information 127 or any information stored about the holder in data store 118*a*. In at least another embodiment, the issuer agent 139 can connect to another authoritative issuer, such as a government database, a credit bureau, and/or a service provider that can assist in validating the specified information in the claims 131. In some embodiments, if a claim 131 cannot be validated or if the claim 131 is determined to not be valid based at least in part on the validation, the claim 131 can be removed from the claims 131 moving forward to block 315. In some embodiments, the process can return to block 303 to request additional information to better validate the claim 131.

Continuing to block 315, the issuer agent 139 can organize the claims 131. The claims 131 can be organized into logical groups. In at least some embodiments, the claims 131 can be organized based at least in part on their hashes 132. For example, the claims 131 can be organized alphanumerically based at least in part on the value of their corresponding hashes 132. In at least some embodiments, the claims 131 can be organized by the relevant subject matter of each of the claims 131. The issuer agent 139 can send the claims 131 to an LLM 140*a* to identify, categorize, and/or organize the claims 131 into logical groups. In some embodiments, the claims 131 can be organized such that the hashes 132 can be arranged into a tree structure and/or a Merkle tree, as previously described in the discussion of FIG. 2.

Next, at block 318, the issuer agent 139 can generate a verifiable credential 130 from the claims 131. In at least some embodiments, the issuer agent 139 can hash each of the claims 131 using a hash function to generate hashes 132. The issuer agent 139 can also hash each of the generated hashes 132 to generate additional hashes to generate a tree structure or a Merkle tree, as previously described in the discussion of FIG. 2. These generated hashes 132, the claims 131, and various other information can be compiled together generate a verifiable credential 130. Verifiable credentials 130 and verifiable presentations can be generated according to various standards, such as a version of the World Wide Web Consortium's (W3C's) Decentralized Identifier (DID) standard.

Finally at block 321, the issuer agent 139 can send the verifiable credential 130 to the holder agent 142. Once block 321 has completed, the flowchart of FIG. 3 can come to an end.

Figure 4:
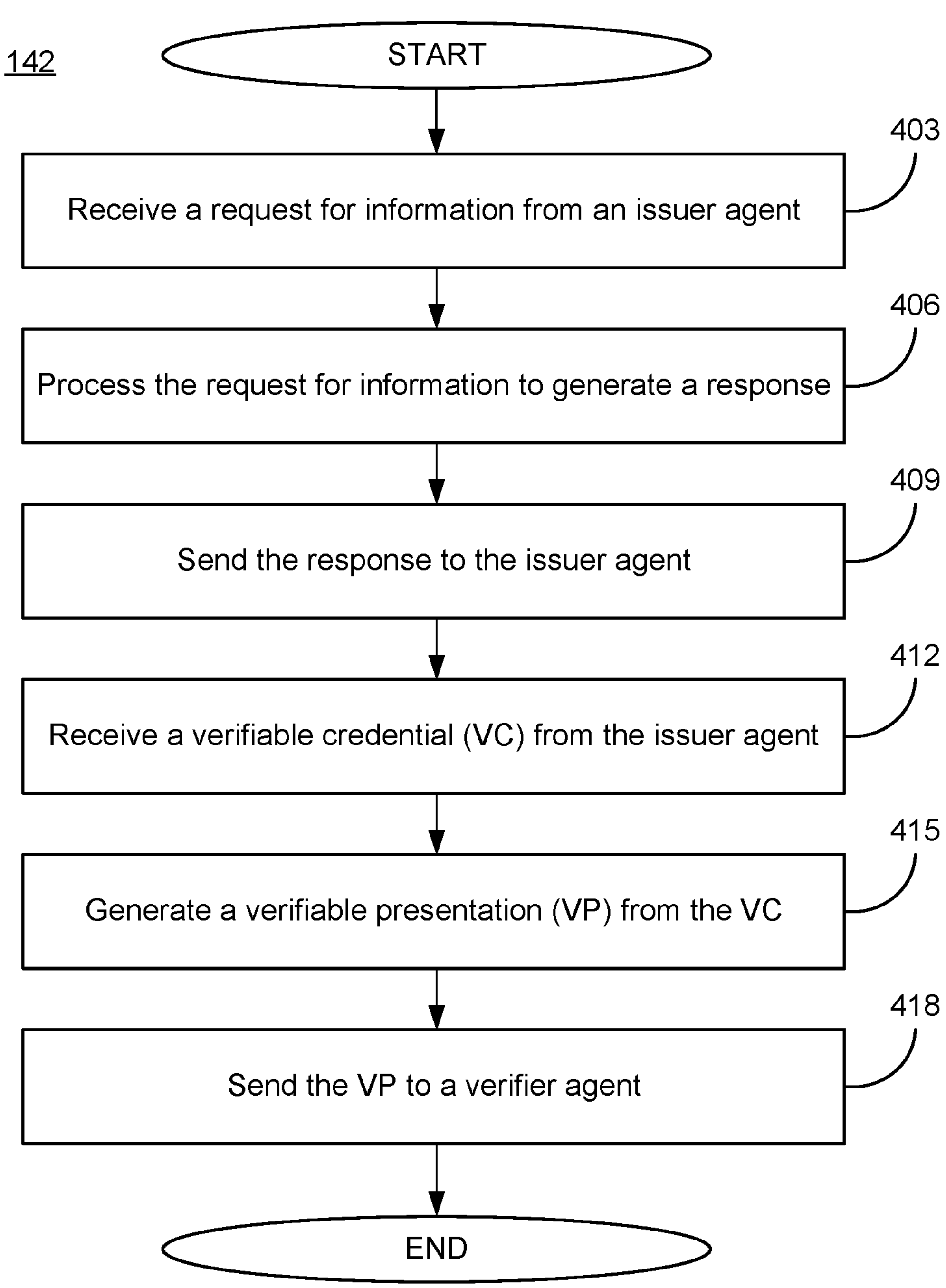
FIG. 4 is a flowchart illustrating one example of functionality implemented as portions of an application executed in a holder device in the network environment of FIG. 1 according to various embodiments of the present disclosure.

Referring next to FIG. 4, shown is a flowchart that provides one example of the operation of a portion of the holder agent 142. The flowchart of FIG. 4 provides merely an example of the many different types of functional arrangements that can be employed to implement the operation of the depicted portion of the holder agent 142. As an alternative, the flowchart of FIG. 4 can be viewed as depicting an example of elements of a method implemented within the network environment 100.

Beginning with block 403, the holder agent 142 can receive a request for information from an issuer agent 139. The request for information can be presented as human-perceivable natural language (e.g., emails, text messages, audio recordings, etc.), as a structured format (e.g., JavaScript Object Notation (JSON), Extensible Markup Language (XML), etc.), as machine-readable code, or other formats. In at least one embodiment, the request for information can be a request to provide specific pieces of information about a subject. For example, the request for information may include a request for a holder's name and account number. Such a request for information could be formatted as a message, like "Please provide your name and account number." In another example, the request for information could be presented as a structured format, like "{name: null, acct_no: null}". In at least another embodiment, the request for information can be a general request. For example, the request for information can be a message that states, "What credential are you seeking to have issued for you?" Various additional data can also be received from the issuer agent 139.

Next, at block 406, the holder agent 142 can process the request for information to generate a response. In some embodiments, the holder agent 142 can extract keywords from the request for information, search for the requested information in the data store 118*b*, and generate the response based at least in part on the information from the data store 118*b*. In at least another embodiment, the holder agent 142 can send the request for information and a directive to prepare the response to LLM 140*b*. In some embodiments, the directive to prepare the response can include instructions to at least provide one or more portions of the requested information. In some embodiments, the directive to prepare the response can include instructions to at least provide one or more portions of the requested information based at least in part on prior interactions between the holder agent 142 and the LLM 140*b*. In other embodiments, the directive to prepare the response can include instructions to synthesize an appropriate answer based at least in part on the request for information. The holder agent 142 can receive a response from the LLM 140*b* that is representative of one or more claims 131. The response from the holder agent 142 can be presented as human-perceivable natural language (e.g., emails, text messages, audio recordings, etc.), as a structured format (e.g., JavaScript Object Notation (JSON), Extensible Markup Language (XML), etc.), as machine-readable code, or other formats. The response can provide answers to the request for information sent at block 303. For example, a response to a request formatted as a message, like "Please provide your name and account number" could be "My name is John Doe and my account number is 1234567." In another example, the response to a request for information that is presented as a structured format, like "{name: null, acct_no: null}", could be "{name: 'John Doe', acct_no: 1234567}". In yet another example, for a request for information such as "What credential are you seeking to have issued for you?", a response could be, "Proof of funds," or various other responses based at least in part on the purpose of the embodiment. Continuing to block 409, the holder agent 142 can send the response to the issuer agent 139.

Next, at block 412, the holder agent 142 can receive a verifiable credential 130 from the issuer agent 139. The verifiable credential 130 can include one or more claims 131 and one or more hashes 132. In at least some embodiments, the hashes 132 can be organized as a tree structure that include leaf nodes and branch nodes, as previously described in the discussion of FIG. 2. In some embodiments, each leaf node can be represented as a hash 132 of a claim 131 of the verifiable credential 130. In some embodiments, each branch node can be represented as a hash 132. In some embodiments, the branch nodes can be generated by using a hash function on two or more child nodes, as previously described in the discussion of FIG. 2. The claims 131 of the verifiable credential 130 are pieces of information that an entity asserts about itself or another subject. Examples of claims can include identity information (e.g., citizenship information, passport information, health information, etc.), qualifications (e.g., licenses, education information, certifications, etc.), memberships (e.g., clubs, professional associations, airport lounge access, etc.), ownership information (e.g., digital deeds, tickets, banking information, account information, etc.), and other information. Claims 131 can be presented in human-perceivable natural language, in a structured format (e.g., JavaScript Object Notation (JSON), Extensible Markup Language (XML), etc.), machine-readable code, or other formats.

Continuing to block 415, the holder agent 142 can generate a verifiable presentation from the verifiable credential 130. The verifiable credential 130 can be used to derive verifiable presentations, which are tamper-evident presentations encoded in such a way that the source of the data can be trusted after a process of verification. The verifiable presentations can be synthesized in such a way that the verifiable credential 130 cannot be recreated from the verifiable presentation alone. Verifiable presentations can be generated according to various standards, such as a version of the World Wide Web Consortium's (W3C's) Decentralized Identifier (DID) standard. The holder agent 142 can generate the verifiable presentation based at least in part on the verifiable credential 130. The verifiable presentation can include one or more claims 131. In some embodiments, the verifiable presentation can include one or more proofs. Each proof can correspond to at least a portion of the claims 131 within the verifiable credential 130. In at least some embodiments, the verifiable presentation can include one or more of the hashes 132 of the verifiable credential 130 such that a verifier application 145 can calculate the root hash 132 during its verification.

Next, at block 418, the holder agent 142 can send the verifiable presentation to the verifier agent 145. Once block 418 has completed, the flowchart of FIG. 4 can come to an end.

Figure 5:
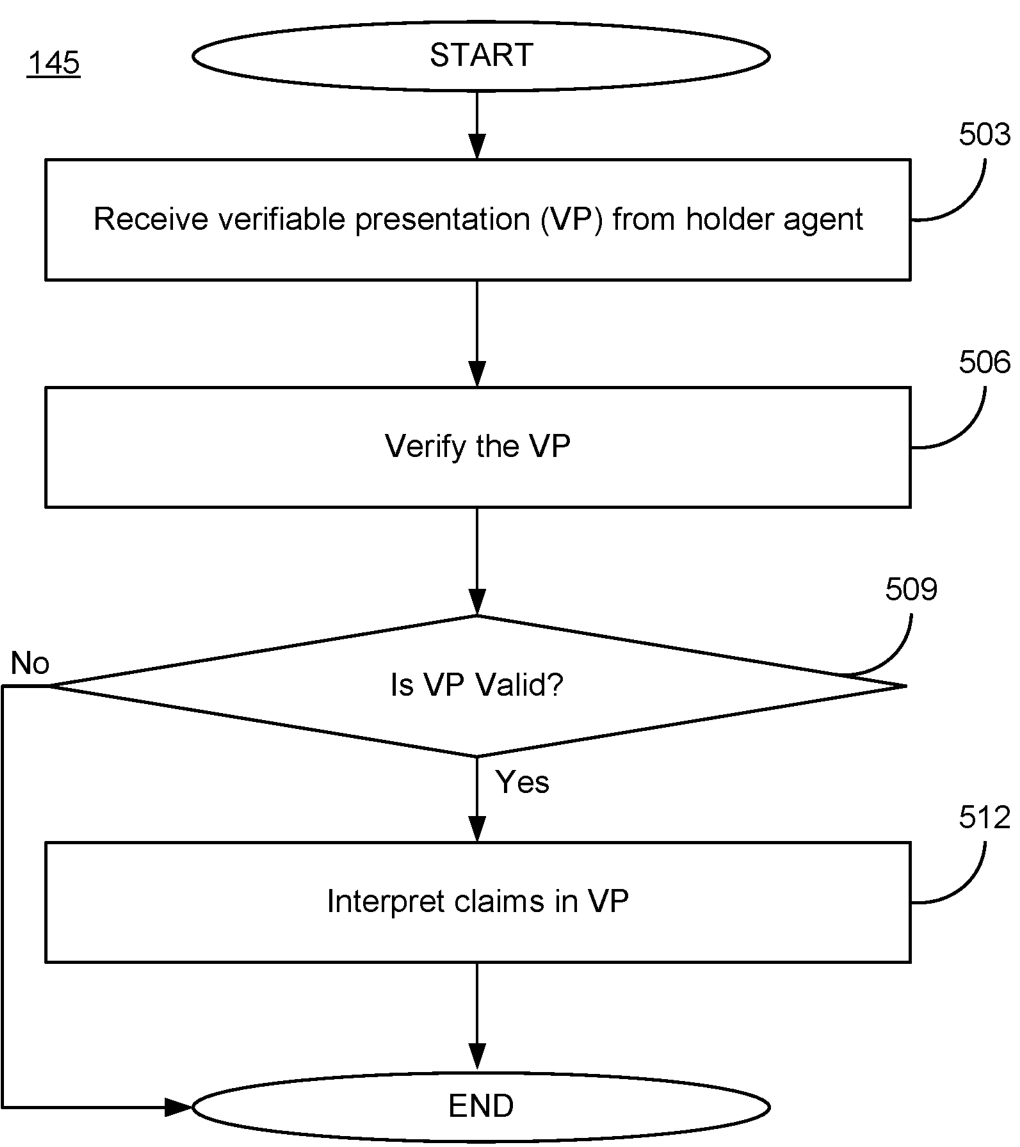
FIG. 5 is a flowchart illustrating one example of functionality implemented as portions of an application executed in a verifier device in the network environment of FIG. 1 according to various embodiments of the present disclosure.

Referring next to FIG. 5, shown is a flowchart that provides one example of the operation of a portion of the verifier agent 145. The flowchart of FIG. 5 provides merely an example of the many different types of functional arrangements that can be employed to implement the operation of the depicted portion of the verifier agent 145. As an alternative, the flowchart of FIG. 5 can be viewed as depicting an example of elements of a method implemented within the network environment 100.

Beginning with block 503, the verifier agent 145 can receive a verifiable presentation from a holder agent 142. Verifiable presentations are tamper-evident presentations encoded in such a way that the source of the data can be trusted after a process of verification. The verifiable presentations are synthesized in such a way that the verifiable credential 130 cannot be recreated from the verifiable presentation alone. Verifiable presentations can be generated according to various standards, such as a version of the World Wide Web Consortium's (W3C's) Decentralized Identifier (DID) standard. The verifiable presentation can include one or more claims 131. In some embodiments, the verifiable presentation can include one or more proofs. Each proof can correspond to at least a portion of the claims 131 of a corresponding verifiable credential 130. In at least some embodiments, the verifiable presentation can include one or more of the hashes 132 of the verifiable credential 130.

Next, at block 506, the verifier agent 145 can verify the verifiable presentation. The claims 131 can be verified in various ways. In some embodiments, the claims 131 can be verified using one or more of the hashes 132. For example, the hashes 132 can be compared to checksum values to determine whether the claims 131 are valid. In some embodiments, the claims 131 can be validated using one or more timestamps to determine whether the data was last modified to validate the claims 131. Various other ways of validating the claims 131 can also be used. In some embodiments, the claims 131 can be validated using zero-knowledge proofs. Zero-knowledge proofs are protocols that enable a holder agent 142 to prove to a verifier agent 145 that a certain statement is true, without revealing any information about the statement itself. Zero-knowledge proofs allow for secure verification of information while maintaining privacy and confidentiality. Examples of zero-knowledge proofs include proofs of knowledge, proofs of membership, proofs of identity, proofs of shuffle, and proofs of solvency. In some embodiments, the verifier agent 145 can verify the verifiable presentation based at least in part on verification standards of Merkle trees, as previously described in the discussion of FIG. 2.

At decision block 509, the verifier agent 145 can determine whether the verifiable presentation is valid. If the verifier agent 145 determines that the verifiable presentation is not valid, the process of FIG. 5 can come to an end. If the verifier agent 145 determines that the verifiable presentation is valid, then the process can continue to block 512.

Next, at block 512, the verifier agent 145 can interpret the claims 131 in the verifiable presentation. In some embodiments, the verifier agent 145 can extract keywords from the response to interpret the claims 131. In at least another embodiment, the verifier agent 145 can interpret the claims 131 from the response by directing an LLM 140*c* to process the claims 131. In such an embodiment, the verifier agent 145 can send the response along with a directive to the LLM 140*c*. In some embodiments, the directive sent to the LLM 140*c* can indicate that the verifier would like to interpret one or more claims 131 from the plurality of claims 131 included. In some embodiments, the directive sent to the LLM 140*c* can specify a format for how to extract the claims 131, such as human-perceivable natural language (e.g., text, audio recording, etc.), as a structured format (e.g., JavaScript Object Notation (JSON), Extensible Markup Language (XML), etc.), as machine-readable code, or as other formats. Once the claims 131 have been interpreted by the LLM 140*c*, the verifier agent 145 can query the LLM 140*c* for information shared in the claims 131. Once block 512 has completed, the flowchart of FIG. 5 can come to an end.

Figure 6A:
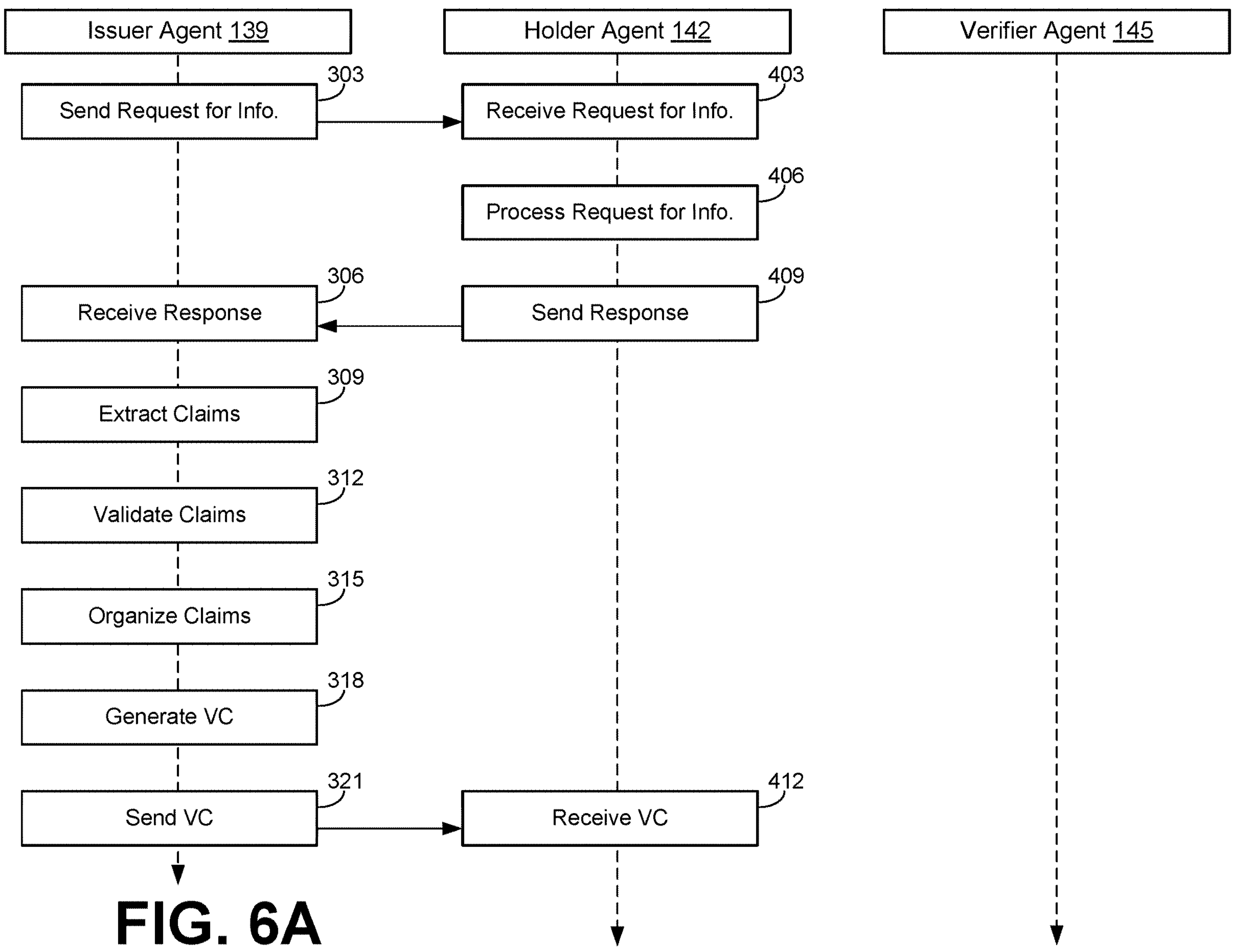
FIGS. 6A and 6B are sequence diagrams illustrating interactions between various components of the network environment of FIG. 1 according to various embodiments of the present disclosure.
Figure 6B:
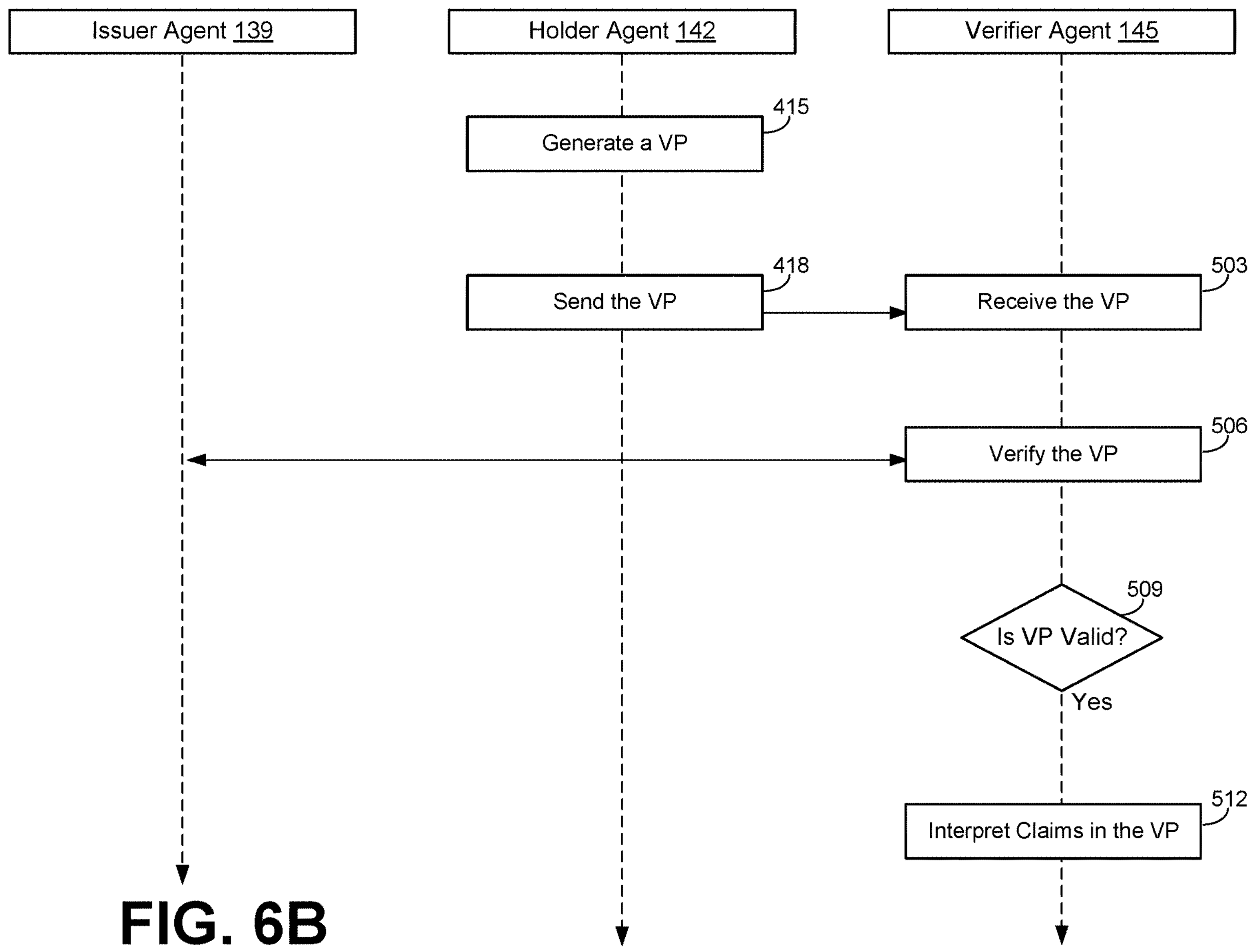

Moving on to FIGS. 6A and 6B, shown are sequence diagrams that provide at least one example of the interactions between the issuer agent 139, the holder agent 142, and the verifier agent 145. The sequence diagrams of FIGS. 6A and 6B provide merely an example of the many different types of functional arrangements that can be employed by the issuer agent 139, the holder agent 142, and the verifier agent 145. As an alternative, the sequence diagrams of FIGS. 6A and 6B can be viewed as depicting examples of elements of one or more method implemented within the network environment 100.

Beginning with FIG. 6A, the issuer agent 139 can send a request for information to a holder agent 142, as previously described in block 303 of FIG. 3, which the holder agent 142 can receive, as previously described in block 403 of FIG. 4. Next, the holder agent 142 can process the request for information to generate a response, as previously described in block 406 of FIG. 4. Next, the holder agent 142 can send the response to the issuer agent 139, as previously described in block 409 of FIG. 4, which the issuer agent 139 can receive, as previously described in block 306 of FIG. 3. Next, the issuer agent 139 can extract claims 131 from the response, as previously described in block 309 of FIG. 3. Next, the issuer agent 139 can validate one or more of the claims 131, as previously described in block 312 of FIG. 3. Next, the issuer agent 139 can organize the claims 131, as previously described in block 315 of FIG. 3. Next, the issuer agent 139 can generate a verifiable credential 130 from the claims 131, as previously described in block 318 of FIG. 3. Next, the issuer agent 139 can send the verifiable credential 130 to the holder agent 142, as previously described in block 321 of FIG. 3, which the holder agent 142 can receive, as previously described in block 412 of FIG. 4.

Continuing with FIG. 6B, the holder agent 142 can generate a verifiable presentation from the verifiable credential 130, as previously described in block 415 of FIG. 4. Next, the holder agent 142 can send the verifiable presentation to a verifier agent 145, as previously described in block 418 of FIG. 4, which the verifier agent 145 can receive, as previously described in block 503 of FIG. 5. Next, the verifier agent 145 can verify the verifiable presentation, as previously described in block 506 of FIG. 5. Next, the verifier agent 145 can determine whether the verifiable presentation is valid, as previously described in block 509 of FIG. 5. Next, the verifier agent 145 can interpret the claims 131 in the verifiable presentation, as previously described in block 512 of FIG. 5. Subsequently, the sequence diagrams of FIGS. 6A and 6B can come to an end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same network environment 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

send a request for information to a client device, the client device being identified by a client decentralized identifier (client DID);

receive a message from the client device;

extract claims from the message by at least sending, to a large language model (LLM), the message and a directive to at least extract one or more claims from the message;

validate at least one claim in the claims;

generate a verifiable credential (VC) for the client DID based at least in part on the claims; and send the VC to the client device.

2. The system of claim 1, wherein the machine-readable instructions that extract the claims from the message, when executed by the processor, further cause the computing device to at least:

receive, from the LLM, the claims.

3. The system of claim 2, wherein the directive to extract the one or more claims from the message further includes formatting the claims as a plurality of key-value pairs.

4. The system of claim 3, wherein at least one key in the plurality of key-value pairs is generated by the LLM based at least in part on contextual language within the message.

5. The system of claim 1, wherein the machine-readable instructions, when executed by the processor, further cause the computing device to at least organize, prior to generating the VC, each claim of the claims into logical groups.

6. The system of claim 5, wherein the machine-readable instructions, when executed by the processor, further cause the computing device to at least:

hash each of the claims to generate claim hashes; and hash one or more of the claim hashes for each logical group to generate logical group hashes.

7. The system of claim 6, wherein the claim hashes and logical group hashes are hashed to conform to a Merkle tree data structure.

8. A method, comprising:

receiving, by a client device from an issuer service, a request for information;

processing, by the client device, the request for information to provide a response;

sending, by the client device to the issuer service, the response;

receiving, by the client device from the issuer service, a verifiable credential (VC), the VC comprising claims that correspond at least in part to the response, where the claims are extracted from a message at least in part by sending, to a large language model (LLM), the message and a directive to at least extract one or more claims from the message;

generating a verifiable presentation (VP) based at least in part on the VC, the VP comprising one or more proofs, each proof of the one or more proofs corresponding to a portion of the claims within the VC; and sending, by the client device to a verifier application, the VP.

9. The method of claim 8, wherein the VC further comprises hashes, the hashes being organized as a tree structure comprising leaf nodes and branch nodes, such that:

each leaf node in the leaf nodes in the tree is represented as a claim hash that corresponds to a claim in the claims of the VC;

each branch node in the branch nodes is represented as a branch hash, the branch hash generated by hashing a plurality of child claim hashes or by hashing a plurality of child branch node hashes; and a root node is the highest most branch node in the tree structure, the root node having a root branch hash.

10. The method of claim 9, wherein each of the one or more proofs comprises at least two of the hashes that can be used by the verifier application to produce the root branch hash.

11. The method of claim 9, wherein the branch hash is generated by hashing exactly two of a first group of a first child claim hash, a second child claim hash, a first child branch hash, and a second child branch hash.

12. The method of claim 11, wherein each of the one or more proofs comprises the branch nodes that can be used by the verifier application to produce the root branch hash.

13. The method of claim 8, wherein processing the request for information to provide a response further comprises:

sending, by the client device to a large language model (LLM), the request for information and a directive to prepare the response, the directive to prepare the response comprising instructions to at least provide at least a first portion of the information based at least in part on prior interactions; and receiving, by the client device from the LLM, the claims.

14. The method of claim 13, wherein the directive to prepare the response that comprises the instructions which further generate a prompt on the client device to obtain at least a second portion of the information.

15. A non-transitory, computer-readable medium, comprising machine-readable instructions that, when executed by a processor of a computing device, cause the computing device to at least:

receive a message from a client device, the client device being identified by a client decentralized identifier (client DID);

extract claims from the message by at least sending, to a large language model (LLM), the message and a directive to at least extract one or more claims from the message;

generate a verifiable credential (VC) for the client DID based at least in part on the claims; and send the VC to the client device.

16. The non-transitory, computer-readable medium of claim 15, wherein the machine-readable instructions that extract the claims from the message, when executed by the processor, further cause the computing device to at least:

receive, from the LLM, the claims.

17. The non-transitory, computer-readable medium of claim 16, wherein the directive to extract the one or more claims from the message further includes formatting the claims as a plurality of key-value pairs.

18. The non-transitory, computer-readable medium of claim 17, wherein at least one key in the plurality of key-value pairs is generated by the LLM based at least in part on contextual language within the message.

19. The non-transitory, computer-readable medium of claim 15, wherein the machine-readable instructions, when executed by the processor, further cause the computing device to at least organize, prior to generating the VC, each claim of the claims into logical groups.

20. The non-transitory, computer-readable medium of claim 19, wherein the machine-readable instructions, when executed by the processor, further cause the computing device to at least:

hash each of the claims to generate claim hashes; and hash one or more of the claim hashes for each logical group to generate logical group hashes.

* * * * *